Patented May 9, 1939

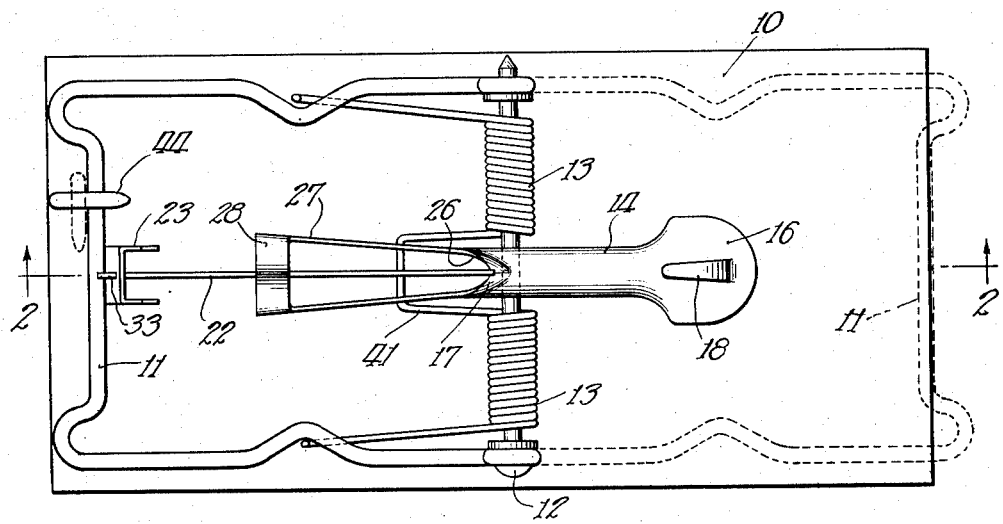

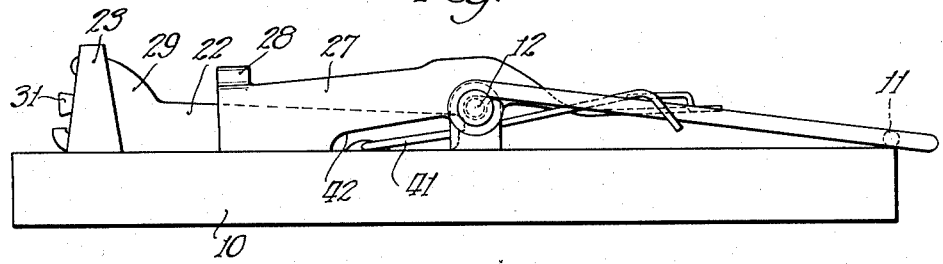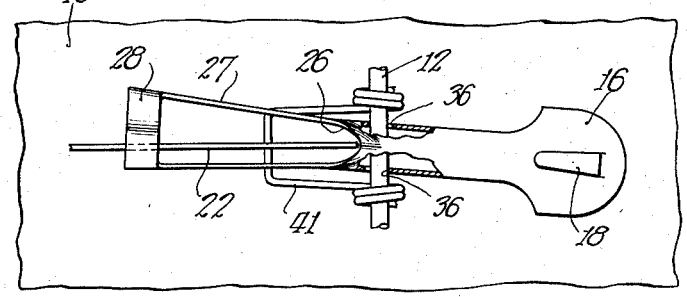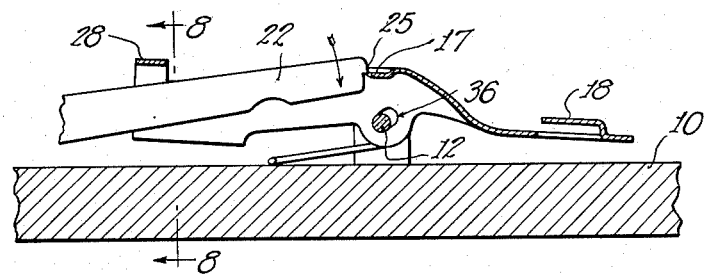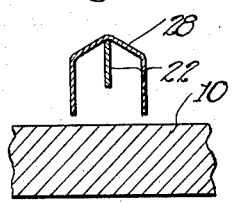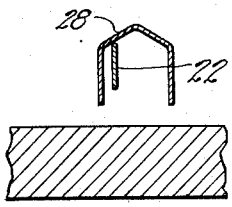

2,157,222

UNITED STATES PATENT OFFICE 2,157,222

ANIMAL TRAP

Herbert A. Stilson, Chicago, and Robert H. Sharp, Marengo, Ill.; said Sharp assignor to said Stilson Application April 20, 1935, Serial No. 17,412

17 Claims. (Cl. 43—81)

Our invention relates in general to animal traps and in particular to a mouse or rat trap in which the usual spring actuated jaw may be released upon movement of the releasing means in any one of three directions. In some of its aspects it relates primarily to self-setting traps, that is, traps in which the jaw is automatically latched when it is moved to the "set" position.

In the traps usually employed for catching mice and rats, the release means operates in only one direction, namely downwardly. The animal often removes the bait from such traps without releasing the trap. In the prior Patent No. 1,530,918, issued March 24, 1925, was disclosed a trap which would release upon movement in more than one direction, but except for the traps disclosed in the copending application, Serial No. 753,000, filed November 14, 1934 (now matured into Patent No. 2,100,926, dated November 30, 1937), by Herbert A. Stilson, one of the present inventors, no self-setting trap of this type has been known, and if others have been proposed they have all been so complicated as to cause some difficulty and irregularity in releasing the trap, and in addition would be so expensive a structure as to be impractical. Even with a feature permitting the release of the trap in more than one direction it is still necessary, in order to be practical from a sales standpoint, that the trap be sold at the very low price prevalent for devices of this nature on the market at the present time.

This invention may be considered an improvement over the prior application above named, being even simpler than the form there shown, even though retaining the self-setting and multidirectional release features.

The present invention therefore has among its objects the same objects that were accomplished by the prior application above named especially the provision of an improved, sturdy, inexpensive and preferably self-setting animal trap provided with a three-way release mechanism as sensitive as ordinary one-way release mechanisms.

A further object of the present invention is to provide a three-way release mechanism in which the functions of the two-piece release treadle of the prior application are performed by a single treadle member thereby effecting economy both in materials and in time of assembly.

An additional object is to provide means for positively limiting the movement necessary to release the trigger in a manner to avoid variations due to mass production.

Another object is to prevent excess upward movement of the trigger in automatically setting the trap to eliminate the chance of its not properly returning to its seat.

Other advantages and objects will be apparent from the following description taken with the drawings, in which:

Fig. 1 is a plan view of the embodiment of the invention chosen for illustration.

Fig. 2 is a vertical section taken through the line 2—2 of Fig. 1.

Fig. 3 is a fragmentary view similar to Fig. 2, but showing the trap in an intermediate position during setting.

Fig. 4 is a side elevation of the trap released.

Fig. 5 is a fragmentary plan view illustrating the normal operation of the trap by a side pull on the bait treadle.

Figs. 6, 7 and 8 are vertical sectional views illustrating an alternative operation of the trap by a side pull on the bait treadle, Figs. 7 and 8 being taken respectively along the lines 7—7 of Fig. 2 and 8—8 of Fig. 6.

Although this invention may take numerous forms, only one has been chosen for illustration. It comprises an animal trap having a base 10 with a spring actuated jaw 11 pivotally supported thereon, a jaw locking mechanism and a three-way jaw-releasing and bait-holding treadle. Quite often a mouse or rat will approach a trap from the side and remove the bait therefrom without exerting any downward pressure on the treadle. If the treadle responds only to downward pressure, the trap will not release, and the rat or mouse will not be caught. This difficulty is overcome by providing a trap which will release upon movement of the treadle downwardly or to either side.

According to the illustrated form of the invention the jaw 11 is pivoted on a pin 12 and is actuated by a pair of spring coils 13 which are usually formed in one piece as shown. The bait-holding and jaw-release mechanism includes a treadle 14 having a bait-holding portion 16 and an integral trigger support and release portion 17 as shown particularly in Figs. 1 and 2. The bait-holding portion 16 comprises a flat, plate-like portion at the rear end of the treadle 14 with a prong 18 for carrying the bait. At the center of the treadle 14 are formed downwardly extending side walls 19 having elongated pivot apertures 21 through which the pin 12 is passed. The trigger seat 17 formed in the top wall of the treadle 14 is shaped and located substantially as shown, the construction being clearly shown in Figs. 1 and 2.

A trigger 22 (sometimes called a latch in other patents) is pivotally supported at the front of the trap by a pivot support 23 as shown best in Fig. 2 and has its rear end resting on the trigger seat of the treadle 14. The trigger 22 preferably has its rear end cut substantially as shown in Fig. 2, so that when it is in the "set" position as shown in Fig. 2, it can only overlap the trigger seat 17 by the length of the engagement shoulder 24. Thrust shoulder 25 will, if necessary, engage the edge of the trigger seat 17 and normally prevent further dropping of the trigger 22 and the front end of the treadle. This avoids the necessity of expensive machining and positioning of the parts. The lower portion of shoulder 25 recedes so that it may never rest on top of the seat 17 but will always fall past it. If occasion arises, the receding part of the shoulder 25 will engage the V-shaped sides 26 of the trigger seat to insure centering of the trigger on the trigger seat. It should also be noted that the top of the trigger seat slopes downwardly toward its center for the same purpose. To retain the trigger 22 in approximately the proper position when it is not resting on the seat 17, guideway 27 is provided, being formed from extensions of the sides 19 and preferably including a connecting bridge 28 at its forward end. Between the bridge 28 and the trigger seat 17 an open slot is provided so that the trigger may pass therethrough as shown in Figs. 2 and 3.

The trigger 22 comprises an elongated shank extending to an enlarged head 29 having its front end notched to form the operating and pivoting lug 31, the retaining lug 32, and the latching lug 33. The operating lug 31 rests on a strap 34 of the support 23 and is positioned to be struck by the jaw 11 as it is moved to the "set" position shown in Figs. 1 and 2.

The operation of the trap is very simple. Assuming the trap to be in the released position shown in Fig. 4, the jaw is swung up and over to the "set" position. Downward pressure exerted manually on the jaw 11 causes the trigger 22 to pivot to the position shown in Fig. 3. As the rear end of the trigger rises, it raises the front end of the treadle enough so that the engaging point 25 of the trigger can pass the trigger seat 17 of the treadle 14. Movement of the jaw 11 may be limited by the bridge 28 which obstructs the movement of the trigger 22, or it may be limited simply by the construction of the pivot post 23. When the parts are in the position shown in Fig. 3, manual pressure on the jaw 11 may be released, and the trigger 22 will drop to the position shown in Fig. 2, its engagement point 25 coming to rest on the trigger seat 17. The jaw 11 engages the latching lug 33 and is restrained thereby. The slight thrust which is exerted by the jaw 11 on the trigger is transmitted to the trigger seat 17 in substantially a radial direction, i. e. toward the pin 12, so that it has substantially no tendency to rotate the treadle 14 and substantially no opposition to such rotation.

With the parts in the positions shown in Fig. 2, the trap is set and, assuming that bait had previously been placed on the bait-receiving portion 16 of the treadle 14, is ready for use. If a rat or mouse presses downwardly on the bait on the bait-receiving portion 16, the pivotal movement of the treadle 14 about the pin 12 as an axis draws the trigger seat 17 rearwardly to the position shown in Fig. 3. The trigger seat 17, in other words, slides out from under the engagement portion 25 of the trigger 22, thereby releasing the trigger.

As the trigger drops to the position shown in Fig. 4, the lug 33 slides out from above the jaw 11 and releases the jaw which, urged by the springs 13, snaps around to the position shown in dotted lines in Fig. 1, thereby catching the rat.

If the rat, instead of pressing downward on the bait-carrying portion 16 of the treadle, merely pulls the bait sideward in an effort to get it off the treadle, he will swing the treadle in a horizontal plane about one of the fulcrum points 36 which comprises the rear end of the aperture 21. In other words, the fulcrum point 36 on the side of the treadle 14 toward which the bait is pulled, being in engagement with the pin 12 remains in its position while the other side of the treadle moves rearwardly to the position shown in Fig. 6, thus sliding out from under the engagement point 25 of the trigger 22, permitting the trigger to drop and release the jaw 11 as previously described.

In the event that the rat pulls the bait and hence the bait-carrying portion 16 of the treadle laterally and upwardly, the trigger 22 is likewise released from the seat 17. Normally the trigger would remain on the seat with this movement inasmuch as pulling the portion 16 laterally and upwardly to pivot the treadle simultaneously and substantially about both fulcrum points 36 would cause the seat 17 to follow the tip 25 of the trigger, so to speak, and remain under the same, due to the limited downward movement possible for the front end of the treadle. That is, the front end of the treadle would strike the top surface of the base 10 with relatively little movement, as can be seen in Fig. 2. However, the cross member or bridge 28 acting on the trigger 22, as shown in Fig. 7, limits the upward movement of the trigger while positioned on the seat 17 and causes it to slide from said seat upon such movement of the treadle to thereby release the jaw 11.

To minimize the chances of the rat pulling the bait forwardly toward the pin 12, and to place the bait at the right height, the treadle 14 may slope steeply downwardly as at 39 toward the bait-carrying portion 16. It is of course desired that the trigger 22 be substantially centered with respect to the trigger seat 17 at all times. To accomplish this the bridge 28 is shaped with upwardly and inwardly inclining sides as shown in Fig. 7 so that as the trigger 22 is thrust up against the bridge 28, as shown in Fig. 3, it will automatically slide along the side portions of the bridge 28 to the center thereof, as shown in Fig. 7. If the bridge is sufficiently low the trigger 22 may be substantially in contact therewith when the trap is set as shown in Fig. 6, but this will not occur unless the thrust of the shoulder 25 pushes the treadle back so that it settles down to the position shown in Fig. 6. The sloping sides of the bridge 28 will then aid in releasing the trap upon a sideward pull on the bait, since, as shown best in Fig. 8, the resulting swinging movement of the treadle 14 will cause the bridge 28 to ride upwardly on the trigger 22, thereby pivoting the treadle 14 in the same way as if the rat had pressed downwardly on the bait-receiving portion thereof. This feature may be entirely omitted without affecting the normal operation of the trap. Of course in any event the side walls of the guideway 27 should be far enough apart to permit enough swing of the treadle to release the trigger.

Although the reaction between the lower portion of shoulder 25 and the V-shaped front edge of the seat 17 will usually center the trigger on the seat, it is preferred that the need for this be minimized by keeping the trigger from rising much beyond the seat. This is accomplished by a stop strap or lug 40 on the pivot support 23 for engaging a shoulder on the trigger 22. This limits the pivotal movement of the trigger and the downward movement of the jaw 11 in setting the trap.

It should be noted that for normal action of the treadle it is important that when the trap is set, the treadle be in its forward position as shown in Fig. 2 with both of the fulcrum points 36 in contact with the pin 12. To give the treadle a bias toward this position it is preferred that the top 38 of the aperture 21 be inclined downwardly and forwardly as shown, so that the weight of the treadle will force the treadle forwardly to the position shown in Fig. 2. With the wall 38 in the position shown, the trap may be tilted with its rear end considerably below its forward end and still be set satisfactorily. This is desirable simply to avoid difficulty on the part of users who do not understand its operation. Such a steep position of the wall 38 may make the trap slightly less sensitive as to sideward pull on the bait than if the walls 38 were substantially horizontal, and although it is believed that the trap will be sensitive enough as shown, the wall 38 may be provided at a more nearly horizontal angle if greater sensitivity is desired.

It should be noted that in making the two spring coils 13 from a single member, their connecting portion 41 is shaped substantially as shown in Fig. 1, thereby pressing on the base 10 of the trap and forming an anchor for the stationary ends of the spring coils 13. To prevent interference between the treadle 14 and this connecting portion 41 of the springs, the sides 19 of the treadle are cut out or recessed as at 42. Likewise the trigger 22 may be provided with a recess 43.

The problem of handling strong traps such as rat traps in displaying, selling and demonstrating them, has always been vexing, since there is considerable danger of injury to the demonstrator's or customer's hands if the trap snaps unexpectedly. It should be realized that it is desirable that the trap be extremely sensitive so that a very slight pressure on the treadle 16 or even a jar of the trap as a whole will cause the trap to snap. To overcome this difficulty the present trap or at least any demonstration model thereof is preferably provided with a snap limiting means such as a hook 44 screwed or otherwise secured into the base 10. In demonstrating the trap the jaw will be caught by the hook 44 when it is released, and will not snap to the position shown in dotted lines in Fig. 1. When the trap is to be used, however, the hook 44 will be removed or simply moved to the position shown in dotted lines in Fig. 1, thus permitting the trap to function in its normal manner.

Although but one embodiment of our invention is herein shown and described, it is to be understood that we are not limited thereby, but limit our invention only by the scope of the appended claims.

We claim:

1. An animal trap including a base, a spring actuated jaw pivoted on said base, a trigger for releasably holding said jaw in the set position, and a treadle for releasably retaining said trigger in the jaw holding position; said treadle including an elongated bait receiving portion having at one end a trigger seat arranged to engage the tip end of said trigger, a pair of fulcrum points on opposite sides of said trigger seat for engaging a relatively fixed fulcrum on said base whereby movement of the other end of said bait receiving portion of said treadle toward either side will swing said treadle about one or the other of said fulcrum points and slide said trigger seat out from under said trigger to release said trigger and said jaw, an extension on said treadle forming a guideway for confining said trigger to approximately its proper lateral position, and means for guiding said trigger more closely to its proper lateral position.

2. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, and side walls spaced on opposite sides of said seat and each having an elongated aperture therein for engaging said pivot pin; said apertures being shaped with their upper walls sloping downwardly and forwardly to cause said treadle to assume its forwardmost position with the rear ends of said apertures engaging said pivot pin.

3. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, and side walls spaced on opposite sides of said seat and each having an elongated aperture therein for engaging said pivot pin, said trigger seat comprising walls sloping downwardly toward its center.

4. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, and side walls spaced on opposite sides of said seat and each having an elongated aperture therein for engaging said pivot pin, said trigger seat comprising walls sloping downwardly toward its center and forming a forwardly open V at their front ends, the trigger having a tip and a rearwardly facing shoulder below and in the front of said tip for engaging the edge of said walls for centering the trigger on said seat.

5. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, side walls spaced on opposite sides of said seat and each having an elongated aperture therein and normally engaging said pivot pin at the rearward edge of said aperture, and an extension on said treadle forming a guideway for confining said trigger to approximately its proper lateral position.

6. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, side walls spaced on opposite sides of said seat and each having an elongated aperture therein for engaging said pivot pin, said trigger seat comprising walls sloping downwardly toward its center, and an extension on said treadle forming a guideway for confining said trigger to approximately its proper lateral position.

7. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, side walls spaced on opposite sides of said seat and each having an elongated aperture therein for engaging said pivot pin, said trigger seat comprising walls sloping downwardly toward its center and forming a forwardly open V at their front ends, the trigger having a tip and a rearwardly facing shoulder below and in the front of said tip for engaging the edge of said walls for centering the trigger on said seat, and an extension on said treadle forming a guideway for confining said trigger to approximately its proper lateral position.

8. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, side walls spaced on opposite sides of said seat and each having an elongated aperture therein for engaging said pivot pin, and an extension on said treadle forming a guideway for confining said trigger to approximately its proper lateral position, said extension including walls sloping upwardly toward the center of said treadle and located over said trigger to be engaged thereby in its setting movement to center said trigger with respect to said treadle.

9. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, and an extension on said treadle forming a guideway for confining said trigger to approximately its proper lateral position, said extension including walls sloping upwardly toward the center of said treadle and located over said trigger to be engaged thereby in its setting movement to center said trigger with respect to said treadle.

10. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, and an extension on said treadle forming a guideway for confining said trigger to approximately its proper lateral position, said extension including a cross member positioned over said trigger and at a height with respect to said trigger such that after the trap is set said cross member may by engagement with said trigger limit the downward movement of the front end of said treadle.

11. An animal trap including a base, a spring actuated jaw, a pivoted trigger for holding said jaw in the set position and operable by said jaw to its holding position, a pivot pin carried by said base, a forwardly extending treadle pivoted on said pivot pin and including a trigger seat slightly spaced above said pin and positioned to engage the rear end of said trigger, and an extension on said treadle forming a guideway for confining said trigger to approximately its proper lateral position, said extension including a cross member positioned over said trigger and at a height with respect to said trigger such that when the trap is set said cross member will by engagement with said trigger limit the downward movement of the front end of said treadle, and said cross member sloping downwardly from its center whereby a pivotal movement of said treadle about a vertical axis will cause it to pivot about said pivot pin and release said trigger.

12. An animal trap including a base, a spring actuated jaw, a pivoted trigger for holding said jaw in the set position, a pivot pin carried by said base, a forwardly extending treadle pivoted on said pivot pin and including a trigger seat slightly spaced vertically from said pin and positioned to engage the rear end of said trigger, and an extension on said treadle, said trigger and treadle extension having portions coacting along an inclined plane whereby pivoting of the treadle about a vertical axis will cause it to pivot about a horizotal axis in a direction to release the trigger.

13. An animal trap including a base, a spring actuated jaw pivoted on the base, and means for releasably holding said jaw including a trigger controlling the jaw, operated to a jaw-holding position by movement of the jaw to the set position, and having a contact surface thereon, and a treadle having a seat against which the contact surface rests when the trap is set and movable in a given releasing direction to release the trigger and trap; said treadle also including a pair of spaced fulcrum points both normally bearing removably against a relatively fixed fulcrum on said base at positions in a line approximately perpendicular to the direction of release, whereby a pivoting of said treadle about either one of the fulcrum points in a direction to cause the other fulcrum point to leave the fulcrum will move the seat generally in the releasing direction.

14. An animal trap including a base, a spring actuated jaw pivoted on the base, and means for releasably holding said jaw including a trigger controlling the jaw and having a contact surface thereon, and a treadle having a seat against which the contact surface rests when the trap is set and movable in a given releasing direction to release the trigger and trap; said treadle also including a pair of spaced fulcrum points both normally bearing removably against a relatively fixed fulcrum on said base at positions in a line approximately perpendicular to the direction of release, whereby a pivoting of said treadle about either one of the fulcrum points in a direction to cause the other fulcrum point to leave the fulcrum will move the seat generally in the releasing direction, and means preventing a simultaneous pivotal movement of the treadle about an axis through both fulcrum points with a compensating tendency to keep the seat in engagement with the contact surface.

15. An animal trap including a base, a spring actuated jaw, a pivoted trigger for holding said jaw in the set position, a pivot member carried by the base, and a treadle including an inclined surface resting on the pivot, the reaction between the inclined surface and the pivot normally thrusting the treadle forwardly to a position where it engages the trigger to hold it in its holding position, said treadle being slidable in a rearward direction to release the trigger.

16. An animal trap including a base, a spring actuated jaw, a pivoted and rearwardly extending trigger for holding the jaw in set position, a pivot pin carried by the base, a treadle carried by the pivot pin and having its free end extending rearwardly and including a trigger seat above the pivot pin engaging the end of the trigger; said treadle being operable to release the trigger by a simple pivotal action upon downward movement of its free end, including means effective upon movement of its free end in either lateral direction for releasing the trigger, having a forwardly elongated aperture for engaging the pivot pin whereby it may be slid in a rearward direction to release the trigger, and said treadle having a downwardly and forwardly inclined surface adapted to engage the underside of the trigger whereby a generally upward movement of the free end of the treadle will release the trigger.

17. An animal trap including a base, a spring actuated jaw, a pivoted and rearwardly extending trigger for holding the jaw in set position, a support member carried by the base, a treadle carried by the support member and having its free end extending rearwardly and including a trigger seat for holding the trigger in its jaw holding position, including means located forwardly of the support member for preventing a pivotal movement of the treadle by movement of its rear end in the upward direction, and including a downwardly and forwardly inclined surface adapted to engage the underside of the support member upon generally upward movement of the rear end of the treadle for thrusting the treadle rearwardly to release the trigger.

HERBERT A. STILSON.
ROBERT H. SHARP.